(12) United States Patent
Fambach et al.

(10) Patent No.: US 10,072,624 B2
(45) Date of Patent: Sep. 11, 2018

(54) STARTING ELEMENT (71) Applicants: Ralf Fambach, Schonungen (DE); Peter Frey, Gerolzhofen (DE); Michael Heuler, Wuerzburg (DE); Reinhard Feldhaus, Euerbach (DE); Horst Zinssmeister, Kaiserslautern (DE)

(72) Inventors: Ralf Fambach, Schonungen (DE); Peter Frey, Gerolzhofen (DE); Michael Heuler, Wuerzburg (DE); Reinhard Feldhaus, Euerbach (DE); Horst Zinssmeister, Kaiserslautern (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 512 days.

(21) Appl. No.: 14/283,479

(22) Filed: May 21, 2014

(65) Prior Publication Data

US 2014/0345553 A1 Nov. 27, 2014

(30) Foreign Application Priority Data

May 21, 2013 (DE) .................. 10 2013 209 283

(51) Int. Cl.
*F02M 1/16* (2006.01)
*F02N 5/00* (2006.01)
(Continued)

(52) U.S. Cl.
CPC ........... *F02N 5/00* (2013.01); *F16D 25/0635* (2013.01); *F16F 15/134* (2013.01);
(Continued)

(58) Field of Classification Search
CPC ........ F02N 5/00; F16D 25/0635; F16D 25/02; F16D 25/06; F16D 25/062;
(Continued)

(56) References Cited

U.S. PATENT DOCUMENTS 6,193,036 B1  2/2001  Arhab
2006/0207851 A1*  9/2006  Heuler .................... F16H 45/02
192/3.3

(Continued)

FOREIGN PATENT DOCUMENTS

DE          4420959       1/1995
DE      19947435 A1 *    4/2001 ............. F16H 41/24
(Continued)

*Primary Examiner* — Lindsay Low
*Assistant Examiner* — Omar Morales
(74) *Attorney, Agent, or Firm* — Cozen O'Connor (57) ABSTRACT A starting element (100) for use, for example, in a drivetrain of a motor vehicle, includes a piston (310) which divides a first volume (560) that can be filled with a fluid from a second volume (570) that can be filled with a fluid, wherein the piston (310) comprises at least one fluid passage (640) which allows the fluid at least occasionally to pass through the piston (310) from the first volume (560) into the second volume (570) and/or from the second volume (570) into the first volume (560). The at least one fluid passage (640) comprises a passage component part (650) and a receiving opening (660) in the piston (310). The passage component part (650) is inserted into the receiving opening so that at least one passage opening (670) is formed which allows the fluid to pass through at least occasionally.

10 Claims, 5 Drawing Sheets (51) Int. Cl.
*F16D 25/0635* (2006.01)
*F16F 15/134* (2006.01)
*F16D 48/02* (2006.01)
*F16H 45/02* (2006.01)

(52) U.S. Cl.
CPC ............... *F16D 2048/0212* (2013.01); *F16H 2045/0205* (2013.01); *F16H 2045/0226* (2013.01); *F16H 2045/0294* (2013.01)

(58) Field of Classification Search
CPC ......... F16D 2025/081; F16D 2025/087; F16D 25/14; F16H 45/02; F16H 2045/0205; F16H 2045/0215
USPC .......................................... 123/179.1, 179.31
See application file for complete search history.

(56) References Cited

U.S. PATENT DOCUMENTS

2007/0235277 A1  10/2007  Heuler
2011/0005880 A1   1/2011  Carrier

FOREIGN PATENT DOCUMENTS

| DE | 102005012243 | 9/2006 |
| DE | 102007005999 | 10/2007 |
| DE | 19881000 | 4/2010 |
| DE | 102010024926 | 1/2011 |
| GB | 2280733 | 2/1995 |

\* cited by examiner

STARTING ELEMENT

BACKGROUND OF THE INVENTION

1. Field of the Invention

The present invention relates to a starting element such as can be used, for example, within a drivetrain of a motor vehicle.

2. Description of the Related Art

In many motor vehicles, i.e., for example, passenger cars, trucks, utility vehicles, tractors and other corresponding engine-operated vehicles, a drive motor is used for driving one or more driven wheels. A drivetrain of a motor vehicle of this type accordingly comprises the above-mentioned drive motor and additional components as the case may be. A drivetrain of this kind can comprise, for example, a shiftable transmission which provides a plurality of transmission ratios so that it is possible to adapt the torque supplied by the drive motor or the rotational speed thereof by a corresponding selection of a gear and the transmission ratio associated with this gear.

Starting elements by which the drive motor can be temporarily completely or at least partially decoupled from further components of the drivetrain, for example, are used to enable the drive motor to continue running also when a motor vehicle of the type mentioned above is stationary, which may be advisable, for example, under certain operating conditions with an internal combustion engine, i.e., for example, an Otto engine or a diesel engine. In this way, the drive motor can continue running without rotational movement of the driven wheel or driven wheels.

A starting element can operate, for example, based on a hydrodynamic torque converter or also based on a frictionally engaging clutch to name only two examples of corresponding starting elements. In torque converters, which may also include a friction clutch, for example, a wet multiple plate clutch, for bypassing the actual torque converter, for example, but also in wet clutches, a liquid can be provided in the interior of a starting element of this kind, for example, for transmitting power, for cooling, for lubrication or for other purposes. Depending on the specific design, it may be possible, for example, to improve a cooling behavior of a clutch of this kind so that installation space can possibly be saved. Moreover, it may also be possible through the use of corresponding hydraulic liquids to actuate a wet multiple plate clutch of this type also by means of a hydrodynamic piston.

In torque converters and other wet multiple plate clutches, so-called piston jets, diaphragms, chokes or other flow limiters in conjunction with a piston of this kind are sometimes used and, depending on the design of a starting element of this kind, can ensure or increase the functionality of the respective clutch. For example, DE 10 2009 045 609 A1 describes a torque transmission system which can be used for a vehicle with a transmission in which a plurality of nozzle orifices are implemented in a corresponding piston.

These nozzle orifices are often arranged in the piston itself by drilling processes. This process is often time-consuming and, further, can lead to contamination, for example, by drillings and other contaminants occurring during machining. Because of these impurities and contaminants, subsequent time-consuming cleaning of the piston in question may sometimes be advisable or possibly even necessary in order not to risk impairing the functionality of the starting element.

Tangential leaf springs, for example, are also used in torque converters. The piston is arranged at a housing cover of the torque converter in question by means of these tangential leaf springs. DE 198 81 000 B4, for example, describes a corresponding torque converter. In order to make it possible to mount the tangential leaf springs, openings are provided at the piston so as to be distributed along the circumference. These openings are used during the assembly process to rivet the tangential leaf springs to the cover by means of a riveting tool reaching through the openings. They can also be screwed or welded to the cover, for example, by using other corresponding tools. After this process, they are tightly closed, which can be accomplished, for example, by plugs. Also, special seals can be provided or sealing disks can be used. In these constructions, all of the openings are completely sealed for the purpose of ensuring functionality.

SUMMARY OF THE INVENTION

A starting element according to an embodiment of the present invention such as can be used, for example, for a drivetrain of a motor vehicle, comprises a piston which divides a first volume that can be filled with a fluid from a second volume that can be filled with a fluid. The piston comprises at least one fluid passage which allows the fluid at least occasionally to pass through the piston from the first volume into the second volume and/or from the second volume into the first volume. The at least one fluid passage comprises a passage component part and a receiving opening in the piston, wherein the passage component part is inserted into the receiving opening so that at least one passage opening is formed which allows the fluid to pass through at least occasionally.

A starting element according to an embodiment of the invention is based on the insight that the production of the same can be facilitated in that the at least one fluid passage of the piston is realized in that a passage component part is inserted into the receiving opening so as to at least partially form a corresponding passage opening for the fluid. In this way, it may be possible where appropriate to facilitate the production of the piston in that, instead of a comparatively delicate opening, a receiving opening of larger dimensions is provided in the piston for the passage component part. Accordingly, the passage opening is first formed by the insertion of the passage component part into the piston. In this way, the task of providing the passage opening devolves at least partially on the production of the passage component part, which in turn may possibly facilitate a production of the piston.

The piston divides the first volume from the second volume, which does not in any way imply that the piston completely separates the two above-mentioned volumes from one another in a fluid-tight manner. Thus it can also be possible for the fluid to arrive in the second volume from the first volume, or vice versa, by other paths apart from the at least one passage opening of the at least one fluid passage. This may depend upon the operating state of the starting element. For example, a path of this kind can be open in one operating state of the starting element but closed in another operating state.

By virtue of the fact that the passage component part is inserted into the receiving opening of the piston, the passage component part closes the receiving opening at least partially. Of course, a plurality of fluid passages, possibly with a plurality of receiving openings and correspondingly a plurality of passage component parts, can also be implemented in an embodiment of a starting element. The receiving openings and the corresponding passage component parts can be identical or can differ from one another independent from one another. The fluid can be, for example, a liquid, i.e., an oil, for example, but can also be a gas. The passage component part can be constructed as a component part which is separate from, independent from and different than the piston. Also, a plurality of passage openings can be formed at least partially by a passage component part.

Optionally, in a starting element according to an embodiment the passage component part can have a smaller material thickness than the piston. In this way it may be possible where appropriate to provide the structures necessary for the passage opening more economically, which may make it possible to employ production methods which are simpler to implement.

Material thickness can be an extension of the relevant materials of the piston and of the passage component part perpendicular to the receiving opening. Accordingly, it can be a sheet-like material, for example, which is used for the passage component part and/or for the piston.

Additionally or alternatively, the passage component part can comprise a metallic material and/or a plastic, for example. A metallic material of this kind can be, for example, a metal or an alloy with metallic and/or nonmetallic alloy constituents. Optionally, further additions, e.g., glass fibers or carbon fibers, can also be comprised. The same holds true for plastics which can be, for example, injection-moldable plastics which may possibly also be influenced with respect to their mechanical, thermal or other characteristics by additions of glass fibers, carbon fibers or other additions.

Additionally or alternatively, the passage component part can be connected to the piston perpendicular to the receiving opening by frictional engagement, positive engagement and/or bonding engagement. A nonpositive or frictionally engaging connection is brought about by static friction, a bonding connection is brought about by molecular or atomic interactions and forces, and a positively engaging connection is brought about by a geometric connection of the relevant mating parts. Accordingly, the static friction generally presupposes a normal force component between the two mating parts.

Accordingly, a passage component part can optionally comprise a closure portion and a further portion, and the closure portion is arranged substantially parallel to the receiving opening and at least partially closes the latter. The further portion can extend substantially perpendicular to the closure portion and can be formed, for example, such that it can be mechanically fixed in the receiving opening. However, a passage component part can also have a further fastening portion which is arranged, for example, parallel to a closure portion which is connected thereto by the further portion. In this case, the further portion can also be referred to as "connection portion". If the further portion is used for mechanically fixing in the receiving opening, this can allow a frictionally engaging connection with an edge of the receiving opening, for example. Conversely, if a fastening portion is implemented parallel to the closure portion, this can serve, for example, additionally or alternatively, for a positively engaging connection of the passage component part to the piston.

Additionally or alternatively, in a starting element according to an embodiment of the present invention the receiving opening can be formed such that an area between the piston and a component part is made accessible to a tool from the side of the piston remote of the component part as assembly opening. In this way, it may be possible where appropriate to further simplify the production of the starting element in that the receiving openings provided for the passage component parts are also used for assembling the starting element.

Optionally, in a starting element according to an embodiment the component part can be connected to the piston by a connection component part, and the receiving opening is arranged in just such way that the connection of the component part and of the connection component part is accessible. In this way it may also be possible where appropriate to provide the otherwise poorly accessible mechanical connection between the connection component part and the component part of the receiving openings. The component part can be, or can at least comprise, a housing shell of the starting element, for example. The connection component part can be, or can comprise, a leaf spring or a tangential leaf spring, for example. The mechanical connection between the component part and the connection component part can be carried out by frictional engagement, positive engagement and/or bonding engagement, i.e., for example, by riveting, screwing or welding.

Additionally or alternatively, the starting element according to an embodiment can be formed so as to transmit a rotational movement around an axis of rotation from an input side to an output side of the starting element. The starting element can accordingly comprise a friction clutch arrangement, for example, to initiate or cancel a frictionally engaging connection between the input side and the output side of the starting element. The piston can be constructed and arranged so as to initiate or cancel the frictionally engaging connection. A frictionally engaging contact exists when two objects enter into frictionally engaging contact with one another such that there is brought about therebetween a force in case of a relative movement perpendicular to a contact surface, which allows a force, a rotational movement or a torque to be transmitted. In so doing, there may be a difference in rotational speed, i.e., slippage, for example. In addition to a frictionally engaging contact of this type, a frictionally engaging contact also includes a frictionally engaging or nonpositive connection between the relevant objects in which a corresponding difference in rotational speed or slippage essentially does not occur.

Optionally, the receiving opening can be oriented substantially perpendicular to the axis of rotation. Additionally or alternatively, the mechanical connection between the component part and the connection component part can be disposed for this purpose on a straight line parallel to the axis of rotation intersecting the receiving opening.

Additionally or alternatively, in a starting element according to an embodiment the passage opening can have a circular contour. In this way it may be possible where appropriate to implement the passage opening using technically simple means. In so doing, a diameter of the passage opening may possibly be smaller than a smallest characteristic length of the receiving opening along a straight line that connects two diametrically opposite points on a contour limiting the receiving opening with respect to a center point of the receiving opening. In other words, the straight line intersects the center point.

Additionally or alternatively, in a starting element according to an embodiment the receiving opening can have a circular contour. In this way, too, it may be possible where appropriate to produce the piston comprising the receiving opening by technically simple means.

Additionally or alternatively, in a starting element according to an embodiment the at least one passage opening can be completely contained in the passage component part. In this case, the passage component part can seal the receiving opening with the exception of the passage opening. In this way it may also be possible where appropriate to define the passage of fluid in a more precise manner in that the passage opening is completely formed by the passage component part.

In an embodiment of this kind, the passage component part can optionally be formed to completely close the receiving opening except for the at least one passage opening. In this way it may be possible where appropriate to fabricate the receiving opening with greater tolerances and thus further facilitate production of the piston.

Additionally or alternatively, in a starting element according to an embodiment at least one passage opening can be formed at a transition from the receiving opening to the passage component part. In this way it may be possible where appropriate to facilitate production of the passage component part.

Optionally, in a starting element according to an embodiment of this kind the passage component part can have, at least in a portion arranged in the receiving opening, an outer contour deviating from an outer contour of the receiving opening. In an embodiment of this kind the passage component part can accordingly have, for example, a convex base portion partially forming an outer contour of the passage component part and at least one recess which also partially forms the outer contour of the passage component part. The convex base portion can accordingly have a circular outer contour, for example. Regardless of this, the recess can be shaped, for example, as a circular segment, circular sector or polygon, i.e., a rectangle or triangle, for example.

Additionally or alternatively, in an embodiment of this type the receiving opening can comprise a convex receiving opening portion and at least one additional portion, wherein the passage component part is formed so as to release the at least one additional portion at least occasionally. In other words, the passage component part can be constructed so as to allow the fluid to pass through at least occasionally via the additional portion of the receiving opening. In this case, also, the convex receiving opening portion can again have a circular outer contour. Regardless of this, the additional portion can again be shaped, for example, as a circular segment, circular sector or polygon, i.e., a rectangle or triangle.

Mathematically speaking, a surface or an opening is a convex set if for any two points of the set, the line connecting these points always also lies entirely within the set. This must be true for all of the points of the relevant set that differ from one another. A connecting line can be a segment of a straight line on which the two points lie.

Depending on the specific construction of a starting element and passage component part, the convex receiving opening portion can be completely or partially covered by the passage component part.

Additionally or alternatively, in a starting element according to an embodiment the fluid passage can have a valve which is formed to allow the at least occasional passage of fluid when a predefined pressure difference between the first volume and second volume is reached or exceeded. In this way it may be possible where appropriate to improve the control of the passage of fluid depending on operating states of the starting element. For example, the valve can be constructed to prevent the passage of fluid when the predefined pressure difference between the first volume and the second volume is not reached. Of course, a plurality of valves can also optionally be formed to open at different pressure gradients between the first volume and the second volume. The pressure gradient indicates the direction from the volume of the first volume and second volume having the higher pressure to the volume of the first volume and second volume having the lower pressure.

Thus in this way it may be possible where appropriate depending on the pressure ratios prevailing at the piston, i.e., the prevailing pressure difference and pressure gradient, to open or close the passage opening correspondingly. Accordingly, the passage component part can optionally comprise a check valve, for example.

The valve can optionally be a check valve which can be constructed, for example, to allow fluid to pass through the valve either only from the first volume into the second volume or only from the second volume into the first volume.

Alternatively, the fluid passage can, of course, also be formed to always allow the passage of the fluid. In other words, the passage opening can always be open.

Additionally or alternatively, a starting element according to an embodiment can comprise at least one further receiving opening, this at least one further receiving opening having a closure which is fluid-tight. In other words, in a starting element according to an embodiment of this kind the passage of the fluid can be prevented by the closure or the relevant further receiving opening such that no fluid is allowed to pass through. The further receiving opening can be identical to or can deviate from the receiving opening of the at least one fluid passage with respect to its construction.

A starting element according to an embodiment can be, for example, a torque converter with or without a lockup clutch or a friction clutch, for example, a wet multiple plate clutch.

In different embodiment examples, the features and arrangements described above can be implemented differently. Accordingly, they can be realized in basically any combination.

Features and detailed solutions can be implemented and realized independent from one another.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiment are described and explained more fully in the following with reference to the accompanying drawings, in which.

DETAILED DESCRIPTION OF THE PRESENTLY PREFERRED EMBODIMENTS

Identical or comparable components are designated by the same reference numerals in the following description of the accompanying drawings. Further, collective reference numerals are used for components and objects which occur more than once in an embodiment example or diagram but which are described collectively with respect to one or more features. Components or objects which are described with identical reference numerals or collective reference numerals may be constructed identically or possibly also differently with respect to one or more or all features, for example, their dimensions, unless otherwise explicit or implicit from the description.

Figure 1:
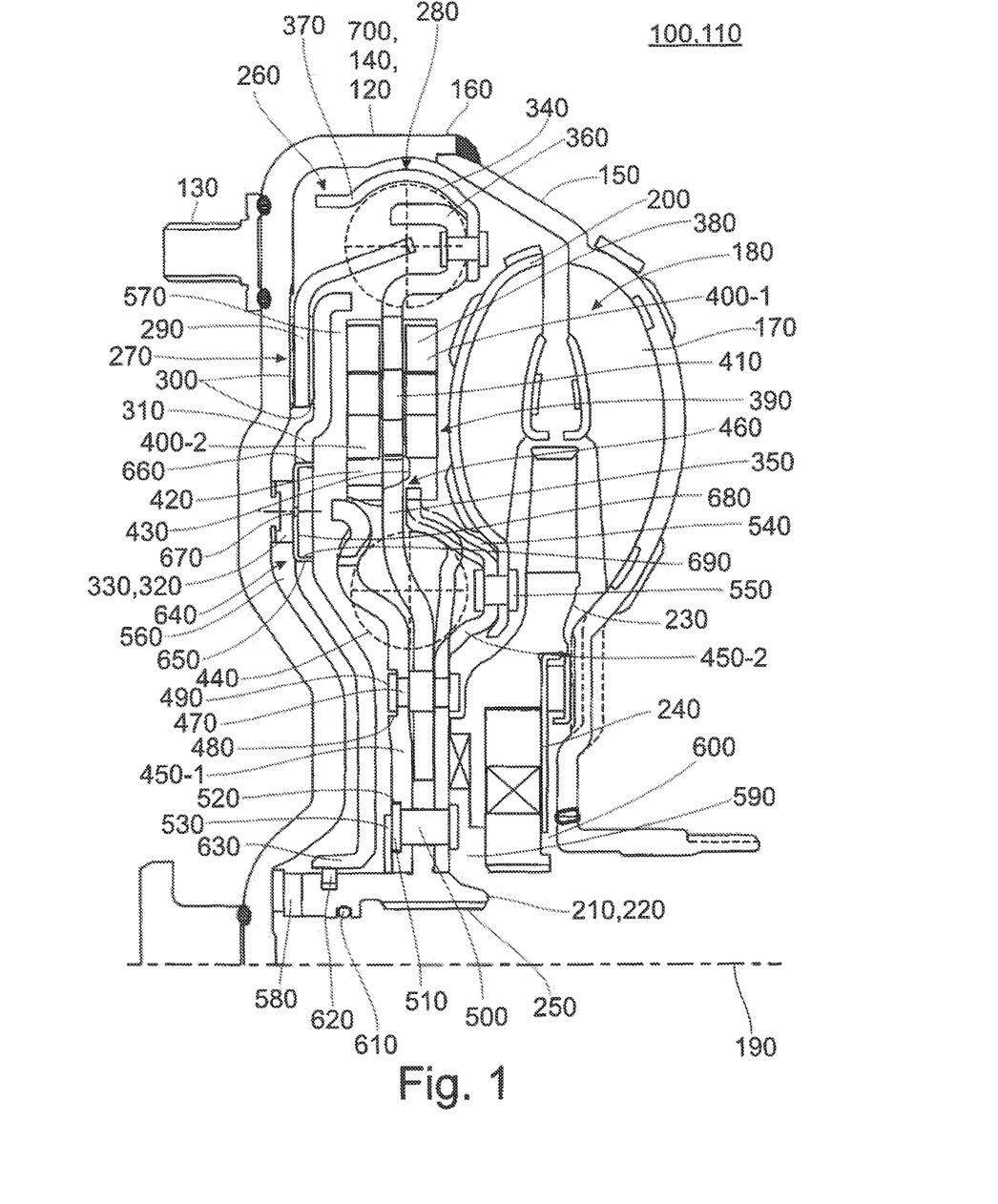
FIG. 1 is a cross-sectional view through a starting element in the form of a hydrodynamic torque converter with a lockup clutch according to an embodiment of the present invention.

FIG. 1 shows a cross-sectional view through a starting element 100 according to an embodiment of the present invention in the form of a hydrodynamic torque converter 110. However, while FIG. 1 shows a starting element in the form of a torque converter 110, the embodiments are in no way limited to torque converters. On the contrary, starting elements 100 can also be implemented in the form of other designs, for example, in the form of a friction clutch. A starting element 100 according to the present invention can also be a friction clutch such as a wet multiple plate clutch.

The starting element 100 has a housing shell 120 which can be arranged at an output shaft of a (drive) motor, i.e., for example, at a crankshaft of an internal combustion engine or at another shaft, so as to be fixed with respect to rotation relative to it via one or more fastening pins 130 which are distributed along a circumference of the housing shell 120 with a flexible connection plate. In this case, the housing shell 120 presents an input side 140 of the starting element 100.

A further housing shell 150 is connected to housing shell 120 so as to be fixed with respect to rotation relative to it and, together with housing shell 120, forms a housing 160 of the starting element 100. The housing shell 120 and the further housing shell 150 are welded together in the present embodiment, but may possibly also be connected to one another by other joining techniques. In other embodiments, a multiple-part construction of the housing 160 can also be implemented where appropriate.

The further housing shell 150 is also referred to as impeller shell because it comprises a plurality of impeller blades 170 which are connected to the further housing shell 150 so as to be fixed with respect to rotation relative to it. Accordingly, together with the further housing shell 150, the impeller blades 170 form an impeller of a hydrodynamic torque converter 180 of the starting element 100. If a rotational movement around an axis of rotation 190 is transmitted via the input side 140 to the housing 160 and, therefore, to the impeller blades 170, a fluid, i.e., an oil, for example, located in the housing 160 can be conveyed and accelerated by the impeller blades 170 to a turbine 200 of the hydrodynamic torque converter 180. As will be described in more detail in the following, the turbine 200 is coupled to a driven hub 210 so as to be fixed with respect to rotation relative to it such that the rotational movement of the input side 140 is transmitted by a fluid flow to the driven hub 210 acting as output side 220 of the starting element 100. The hydrodynamic torque converter 180 further comprises a stator 230 which is bearing-supported via a freewheel 240 relative to the housing 160 and the output shaft, not shown in FIG. 1, which is coupled to the driven hub 210 or output side 220 via a toothing 250.

To improve the efficiency of the starting element 100, the starting element 100 further has a converter bypass 260 connected in parallel with the hydrodynamic torque converter 180. This converter bypass 260 comprises a friction clutch 270 and a torsional vibration damper arrangement 280 which is connected downstream of the friction clutch 270 between the input side 140 and the output side 220 of the starting element 100.

The friction clutch 270 comprises a plate disk 290 having a friction lining 300 on both sides along the axis of rotation 190. In a closed condition of the friction clutch 270, the friction linings 300 of the plate disk 290 are pressed between a corresponding pressing surface of the housing shell 120 and a corresponding pressing surface of a piston 310 to achieve a frictionally engaging connection between the housing shell 120 and the plate disk 290. Of course, the friction facings 300 can also be arranged, for example, at pressing surfaces of the housing shell 120 and of the piston 310 in other embodiments.

The piston 310 is coupled to the housing shell 120, i.e., the input side 140 of the starting element 100, so as to be fixed with respect to rotation relative to it via a connection component part 320. Accordingly, the piston 310 is connected to the housing shell 120, i.e., the input side 140 of the starting element 100, so as to be substantially fixed with respect to rotation relative to it.

The connection component part 320 is designed as a tangential leaf spring 330 but can also be implemented, for example, as a leaf spring or as different corresponding component part which allows rotational movement around the axis of rotation 190 to be transmitted to the piston 310 on the one hand, but also allows an axial motion of the piston 310 along the axis of rotation 190 on the other hand.

In the starting element 100 shown in FIG. 1, the connection component part 320 is put under tension. In so doing, the piston 310 is pressed against the plate disk 290 along the axis of rotation 190 and the friction clutch 270 is accordingly closed in a neutral position of the piston 310. Therefore, this is a friction clutch 270 which is closed in a normal or idle state (normally closed clutch). Of course, other embodiment examples of a starting element 100 or of a friction clutch 270 which is open in an idle state (normally open clutch) can also be implemented.

Correspondingly, the plate disk 290 is also arranged so as to be movable along the axis of rotation 190. This plate disk 290 is coupled with first spring elements 340 of torsional vibration damper arrangement 280. The first spring elements 340 are arranged at a radially outer region of torsional vibration damper arrangement 280.

The torsional vibration damper arrangement 280 further has a hub disk 350 which has, in an area radially overlapping the first spring elements 340, a contact structure 360 which also contacts the first spring elements 340. The first spring elements 340 accordingly form a first stage of a torsional vibration damper of the torsional vibration damper arrangement 280.

For radially guiding the first spring elements 340, the torsional vibration damper arrangement 280 has a cover plate 370 which is riveted to the hub disk 350 in the region of the contact structure 360. The cover plate 370 accordingly overlaps on the radially outer side, thus forming a spring channel in which the first spring elements 340 are arranged.

The hub disk 350 also serves as a support for tuned masses 380 of a tuned mass damper 390. The tuned masses 380 are formed of at least two parts with a first partial tuned mass 400-1 and a second partial tuned mass 400-2 which are arranged on opposite sides of the hub disk 350 with respect to the axis of rotation 190. Partial tuned masses 400 are coupled with one another so as to be fixed with respect to rotation relative to one another by a spacer rivet, not shown in FIG. 1, this spacer rivet engaging in elongated holes, also not shown in FIG. 1, of the hub disk 350. The partial tuned masses 400 can also be formed of multiple parts. The tuned masses 380, or more precisely, the partial tuned masses 400, have corresponding running tracks along which one or more stepped rolling elements guide the tuned masses 380 with respect to a corresponding guide running track in the hub disk 350. The rolling elements 410 have a greater diameter in the region of the hub disk 350 than at its axial ends.

Arranged at the hub disk 350 of torsional vibration damper arrangement 280 radially inwardly of the partial tuned mass 400-2 facing the input side 140 or drive is a supporting ring 420 which is fastened by at least one retention tab 430 in a correspondingly associated opening of the hub disk 350. The supporting ring is implemented only on one side of the hub disk 350, in case of the present embodiment example at the side of the hub disk 350 facing the input side 140, but, owing to the fact that the partial tuned masses 400 of the tuned masses 380 are riveted to the opposite side of the hub disk 350 so as to be substantially fixed with respect to rotation relative to it, also supports the partial tuned mass 400-1 arranged at the latter. In other words, the supporting ring 420 arranged at only one side of the hub disk 350 supports both partial tuned masses 400-1, 400-2 of the tuned masses 380 because the partial tuned masses 400 provided on both sides of the hub disk 350 are connected to one another.

Of course, the supporting ring 420 can also be arranged at the hub disk 350 by other fastening techniques. For example, it can also be riveted or possibly also glued. The hub disk 350 serves as guide component part for the tuned masses 380 which in turn have a first partial tuned mass 400-1 and a second partial tuned mass 400-2 which are arranged along the axis of rotation 190 on both sides of the hub disk 350 or guide component part. The partial tuned masses 400 are accordingly coupled together in just such a way that they execute parallel and synchronous oscillations around a neutral position when correspondingly stimulated. The partial tuned masses 400 have guide running tracks in which at least one rolling element 410 engages and enables a guiding of the partial tuned masses 400 or tuned masses 380 via at least one corresponding counter-running track of the guide component part such that they can execute the above-mentioned oscillation around their neutral position.

The tuned mass damper 390 has the supporting ring 420 which is arranged at only one side along the axial direction or axis of rotation 190 with respect to the guide component part. The supporting ring 420 is constructed so as to prevent the tuned masses 380 from touching. Additionally or alternatively, the supporting ring 420 can also be constructed in such a way that it prevents the rolling elements 410 from impacting in ends of the running tracks or counter-running tracks of the tuned masses 380 and guide component part (hub disk 350). In this way it may be possible to suppress or at least reduce noises perceived as annoying by the driver or other passengers of a corresponding motor vehicle.

Further, the hub disk 350 is in abutment with second spring elements 440 which are arranged radially inwardly with respect to the first spring elements 340. The second spring elements 440 form a second stage of a torsional vibration damper of torsional vibration damper arrangement 280. The second spring elements 440 also contact a first cover plate 450-1 and a second cover plate 450-2 which form a spring channel for the second spring elements 440 for radial guidance. Accordingly, the second spring elements 440 can also be guided via the cover plates 450 with respect to the centrifugal forces acting on them as is also made possible by cover plate 370 with respect to the first spring elements 340.

The supporting ring 420 has on the radially inner side a cutout 460 through which it is possible to provide installation space for the cover plate 450-2 of the radially inner spring set as second spring elements 440.

The cover plate 450-1 is mechanically connected by riveting to the second cover plate 450-2 so as to be fixed with respect to rotation relative to it. Accordingly, FIG. 1 shows a corresponding rivet 470 which extends through the hub disk 350 in a corresponding elongated hole to allow the hub disk 350 to move relative to the two cover plates 450. Cover plate 450-1 which faces the input side 140 of the starting element 100 in the embodiment example shown here has a recess 480 for receiving the rivet head 490 of rivet 470. This makes it possible for the rivet heads 490 to be received in a countersunk manner. In this way, it may also be possible to economize on axial installation space.

Further, the cover plates 450 are mechanically connected to the driven hub 210 by a further riveting connection. FIG. 1 again shows a rivet 500 having a rivet head 510 which is likewise arranged in a recess 520 of the cover plate 450-1 facing the input side 140. In this way, it may also be possible, as the case may be, to save radial installation space. Further, it may also be possible based on this design to bring an adjacently arranged pressure disk 530 into direct contact with the cover plate 450-1 without the need for the latter to have a cutout for the rivet heads 510, for example. In this way it may be possible where appropriate to simplify the pressure disk 530 or a corresponding different component to be brought into contact with the cover plates 450.

An axial bulge 540 is implemented in a radial extension area of the second spring elements 440 at the second cover plate 450-2 which also contacts the radially inner spring set, i.e., the second spring elements 440. This axial bulge 540 makes it possible to fasten the turbine 200 to the second cover plate 450-2 by riveting radially adjacent to the inner spring set, i.e., the second spring elements 440. FIG. 1 shows a corresponding rivet 550 of this rivet connection. In this way it may also be possible, as the case may be, to save radial installation space or also axial installation space for correspondingly implementing a starting element so that other components can possibly be optimized with respect to their dimensions to the benefit of the installation space gained in this way.

As is shown in FIG. 1, the housing 160 of the starting element 100 is divided or split by the piston 310 into a first volume 560 and a second volume 570. The two volumes 560, 570 can be filled with the fluid mentioned above, e.g., an oil, while the starting element 100 is in operation. The first volume 560 which faces the input side 140 of the starting element 100 in the embodiment shown here is also referred to as piston chamber and can be supplied with fluid via a channel 580 in the driven hub 210. The second volume 570 can also be supplied with the fluid via an inlet 590. The fluid can escape from an interior space of the housing 160 comprising both the first volume 560 and second volume 570 via an outlet 600. To enable a selective control of the piston 310, the driven hub 210 has a sealing element 610 in the form of an O-ring by which the channel 580 and, therefore, the first volume 560 is separated from and sealed against the inlet 590 and, therefore, the second volume 570 with respect to the inlet of the fluid. To allow sealing of the piston 310 and, therefore, separation of the two volumes 560, 570, the starting element 100 has a further sealing element 620 which is arranged at an axially extending portion 630 of the piston 310 and accordingly allows an axial displacement of the piston 310 while simultaneously sealing the latter. In this way, the piston chamber, i.e., the first volume 560, can be supplied with fluid by a corresponding control of the channel 580.

With respect to the starting element 100 shown here, it can be useful where appropriate to introduce fluid into the first volume 560 via channel 580 also when the friction clutch 270 is in the closed condition so as to build up and maintain a volume flow through the first volume 560. For example, by arranging corresponding channels in the friction linings 300 the fluid can also flow through the friction clutch 270 in the closed condition of the friction clutch 270 and thus can possibly carry off friction heat arising in the region of the friction linings through a fluid flow that is directed radially outwardly.

To ensure an operation of the starting element 100 and, for example, to make it less likely that the friction clutch 270 will open temporarily as a result of pressure fluctuation, the piston 310 has at least one fluid passage 640. This fluid passage 640 is formed in just such a way that it allows the fluid at least occasionally to flow through the piston 310 from the first volume 560 into the second volume 570. Additionally or alternatively, depending on the specific control of the channel 580, this can also make it possible for the fluid to at least occasionally flow through in the opposite direction, i.e., from the second volume 570 into the first volume 560.

In the embodiment shown here, the piston 310 has a plurality of fluid passages 640 which are arranged at the piston 310 in circumferential direction. The fluid passages 640 have a passage component part 650 which is inserted into a receiving opening 660 of the piston 310. This forms a passage opening 670 which allows the fluid to flow through at least occasionally as was described above.

In the embodiment shown here, the material thickness of the passage component part 650 is less than that of the piston 310. In this way, not only can weight be reduced where appropriate, but production of the passage opening 670 can also possibly be simplified. Thus, depending on specific implementation, the passage component part 650 can possibly be fabricated from, or can comprise, a metallic material. Additionally or alternatively, it can also comprise a plastic, for example, an injection-moldable plastic. Metals as well as alloys with metallic and/or nonmetallic elements can be used as metallic materials, for example. These metallic materials can contain optional additions, for example, glass fibers or carbon fibers. This is also true for the plastics.

The passage component part 650 shown here has a closure portion 680 which is arranged and oriented substantially parallel to the receiving opening 660. In the embodiment shown here, the closure portion 680 closes the receiving opening 660 substantially completely. In this case, the closure portion 680 and, therefore, the passage component part 650 comprise the passage opening 670 substantially completely. Therefore, the passage component part 650 and closure portion 680 do not completely close the receiving opening 660 but, on the contrary, allow the fluid to pass through via the passage opening 670 between the two volumes 560, 570 as was described above.

The passage component part 650 also has a further portion 690 extending substantially perpendicular to the receiving opening 660 and accordingly in the present case substantially parallel to the axis of rotation 190. This is formed to allow a mechanical connection of the passage component part 650 with the piston 310. More precisely, the further portion 690 forms a frictionally engaging connection with an edge of the receiving opening 660 of the piston 310 perpendicular to the receiving opening.

Of course, in other embodiments it is also possible where appropriate to employ a different joining technique in which the passage component part 650 is fastened, for example, by a joining technique forming a positive engagement or bonding engagement. Thus the passage component part 650 can also have, for example, a fastening portion which also extends substantially parallel to the receiving opening and which is arranged parallel to the closure portion 680 and connected to the latter by the further portion 690. In this case, the further portion 690 can also be referred to as connection portion which also makes possible an at least partially frictionally engaging connection perpendicular to the receiving opening 660 in addition.

The receiving opening 660 is formed in such a way in this case that it can also serve as an assembly opening for fastening the connection component part 320 to the housing shell 120. In this case, the housing shell 120 presents a component part 700 to which the connection component part 320 is fastened, and the component part 700 is made accessible via a corresponding tool through the receiving opening 660 from a side of the piston 310 remote of the component part 700. As is also shown in FIG. 1, the receiving opening 660 is arranged in such a way in this case that it provides a location of the mechanical connection of the connection component part 320 to component part 700, i.e., the housing shell 120, through a straight line parallel to the axis of rotation 190 through the center point thereof. More precisely, the starting element 100 comprises a plurality of connection component parts 320 which are arranged along the circumference and by which the piston 310 is mechanically coupled to the housing 160 or the housing shell 120 thereof.

In order to limit a flow or passage of the fluid through the passage opening 670, the latter has a diameter that is smaller than a diameter of the receiving opening 660. As was already explained above, both the receiving opening 660 and the passage opening 670 are substantially circular in the present embodiment. In this case, the diameter of the receiving opening is the smallest characteristic length of the same along a straight line connecting two diametrically opposed points on a contour of the receiving opening 660 with reference to a center point of the receiving opening. In other words, the aforementioned straight line intersects the center point of the receiving opening. The passage component part 650 thus forms an optimized piston jet at least partially via the at least one passage opening 670.

The torque converter 110 shown in FIG. 1 has tangential leaf springs 330 as connection component parts 320 which are fastened, e.g., riveted, to the (housing) cover or housing shell 120 on the one hand and to the piston 310 on the other hand. The riveting is carried out in the present embodiment example through the receiving openings 660 in the piston 310. These receiving openings 660 can be closed subsequently by the passage component parts 650. Depending on the specific construction of a starting element 100 according to the invention, at least one receiving opening 660 or a corresponding passage component part 650 can be formed in such a way that the latter has a passage opening 670. In principle, of course, a corresponding passage component part 650 can also be inserted into more than one receiving opening 660, at most, of course, in every receiving opening 660, and this passage component part 650 forms a passage via a corresponding passage opening 670. Accordingly, the passage openings 670 can take over a function of the piston jet which is otherwise frequently implemented and even required as the case may be. FIG. 1 shows a variant in which the passage component part, also referred to as closure, has a centrally arranged passage or a centrally arranged passage opening 670.

In other words, one or more groups of passage component parts 650 can possibly be implemented in an embodiment example of a starting element 100, wherein the passage openings 670 can be configured differently. Additionally, as shown in FIG.4B a type of closure in which no passage opening 670 is formed, i.e. which actually closes receiving openings 660 or other assembly openings, can also be implemented where appropriate. Of course, identical passage component parts can also be integrated in differently configured receiving openings 660. For example, some receiving openings 660 can be constructed such that they can receive round plugs or passage component parts 650 but form or provide corresponding passages for the fluid.

An embodiment of a starting element 100 can make possible an economical production with a piston 310 which is fastened to a housing shell 120 for example, which piston 310 has one or more passage openings 670 in a particularly simple manner which can be implemented, for example, as piston jets, chokes, diaphragms or the like structures. This can make possible an exchange of fluid acting in at least one direction between a space in front of and behind the piston 310, i.e., between the two volumes 560, 570.

As has already been briefly discussed, problems may possibly arise when providing additional openings in the piston 310 through which contaminants or other disruptive influences may possibly be introduced into the starting element 100 or can impede its production. Embodiments are based instead on forming or altering assembly openings or other receiving openings 660 that may already have been implemented such that they can be used as system-relevant openings themselves or through the intermediary of special elements, namely, the passage component part 650, for example. Accordingly, assembly openings which may have been implemented by the passage component parts 650 can be used in a functionally relevant manner for the operation of the starting element 100 or torque converter 110. This may mean, for example, that at least one receiving opening 660 also serving as assembly opening is used to produce a fluid exchange connection between the spaces in front of and behind or to the left and right of the piston 310, i.e., the two volumes 560, 570. Aside from the construction of a starting element of this type which has already been described with reference to FIG. 1, further constructional variants will be described in the following.

In the solution shown in FIG. 1, the passage opening 670 is integrated in the passage component part 650 which is also referred to as closure element. The passage component part 650 has a defined opening which also serves as a piston jet and in which the assembly opening can be inserted. This element can be produced by stamping, for example, such that the passage opening 670, also referred to as bore hole, can be stamped out during the same stamping process for passage component part 650. Even if this should not be possible, cost advantages and higher cycle numbers may possibly be achieved in a construction of this type against a substantially simpler production compared to the entire piston boring process. In this case in particular, a smaller bore diameter and an easier and simpler cleaning of the passage component parts 650 can result.

Figure 2:
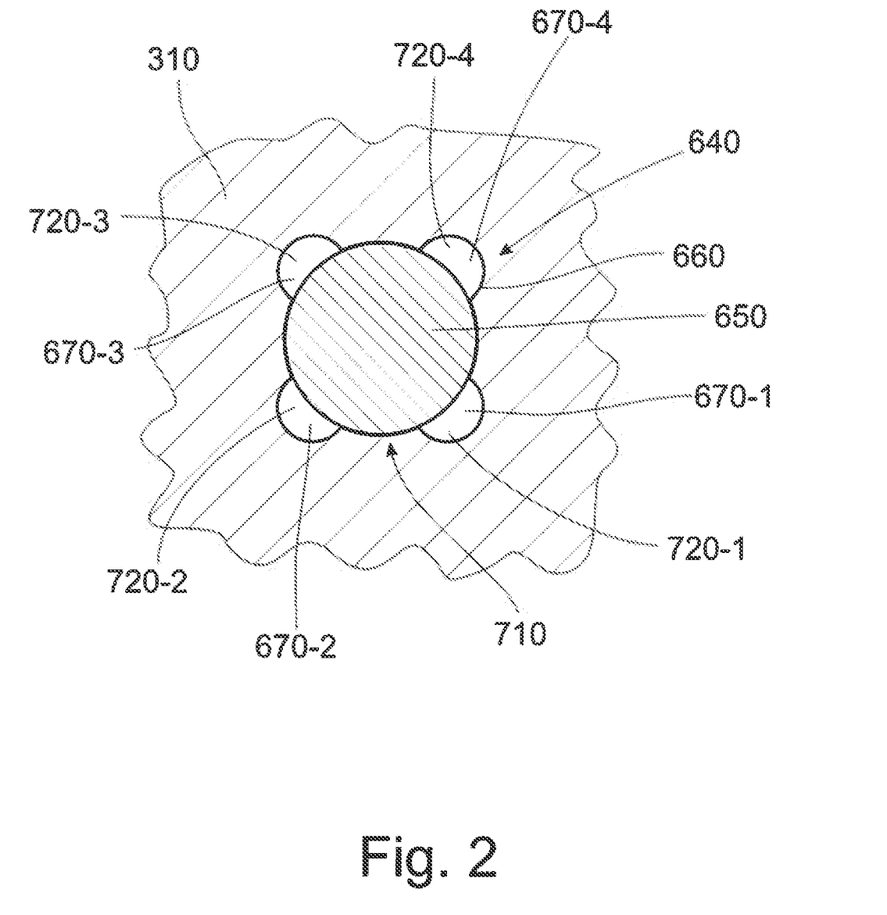
FIG. 2 is a schematic top view of a piston of a starting element according to an embodiment of the present invention with a receiving opening and a passage component part.

FIG. 2 shows a top view of a piston 310 of a starting element 100. In the embodiment shown here, the piston 310 again has as fluid passage 640 a receiving opening 660 and a passage component part 650. In the present case, the passage component part 650 has a circular outer contour without the passage opening being fully implemented in the passage component part 650. Rather, the passage component part 650 presents a plug for a correspondingly circular configuration of a receiving opening 660.

However, as is shown in FIG. 2, the receiving opening 660 is formed in just such a way that at least one passage opening 670 is formed at a transition of the receiving opening 660 and the passage component part 650. Accordingly, the passage component part 650 in this case has, at least in a portion arranged in the receiving opening 660, an outer contour diverging from an outer contour of the receiving opening 660. More precisely, in the embodiment shown here the fluid passage 640 has four passage openings 670-1, 670-2, 670-3 and 670-4. In this case, the receiving opening 660 has, on the one hand, a convex receiving opening portion 710 which is substantially completely closed by the passage component part 650. Further, however, the receiving opening 660 has at least one additional portion 720 which adjoins the convex receiving opening portion 710 and partially forms the outer contour of the receiving opening 660. Accordingly, the receiving opening 660 from FIG. 2 has a quantity of additional portions 720-1, 720-2, 720-3 and 720-4 which corresponds to the quantity of passage openings 670. These additional portions 720-1, 720-2, 720-3 and 720-4 in turn are not sealed or plugged by the passage component part 650, i.e., are left open to allow the fluid to flow through them at least partially. Further, the outer contour of the receiving opening 660 is likewise partially formed by the convex receiving opening portion 710.

FIG. 2 shows a variant of the starting element 100 and the piston 310 thereof in which the surface area of the receiving opening 660 is greater than a surface area of the passage component part and accordingly allows a corresponding passage effect for the passage of the fluid. In this case, the surface area of the assembly opening is larger than a corresponding surface area of the insertion element (passage component part 650). In this case, for example, a non-circular receiving opening 660 can be implemented as is also shown in FIG. 2. This may possibly result in that a correspondingly larger opening can be provided as in the tool for producing the same. In this case, the actual closure element, i.e., the passage component part 650, can possibly make do without an additional opening, i.e., the passage opening 670. It may possibly be advisable in this case to ensure through appropriate use of a joining technique that the closure element is held in the receiving opening 660 in an operationally reliable manner. In other words, FIG. 2 shows an opening in the piston 310 which is not circular.

Figure 3:
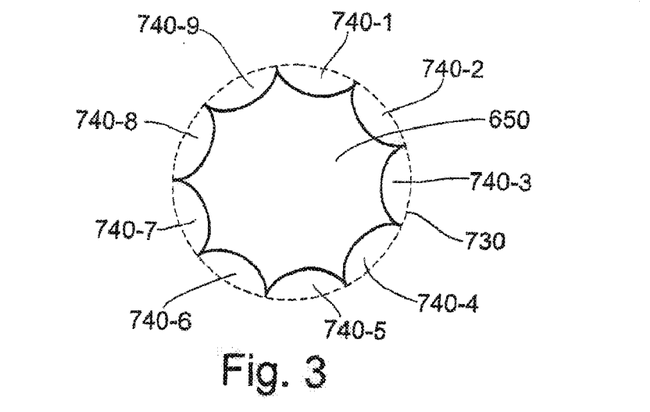
FIG. 3 is a top view of a passage component part of the invention with a non-circular outer contour.

FIG. 3 shows a first embodiment in which a surface area of the passage component part 650 is smaller than a surface area of the receiving opening 660. In this case, a non-circular geometry of the passage component part 650 can be implemented, in which case it must also be ensured again by suitable measures that the passage component part 650 is held in the assembly opening in a reliably operating manner.

When inserted into a circular receiving opening 660 the passage component part 650 shown in FIG. 3 correspondingly forms a quantity of passage openings 670 corresponding to the quantity of recesses 740.

FIG. 3 shows an embodiment in which the passage component part 650 has a non-circular geometry. The non-circular geometry is shown based on a convex base portion shown in dashes in FIG. 3 and a substantially circular outer contour. The convex base portion 730 at least partially forms the outer contour of the passage component part 650.

However, the passage component part 650 has at least one recess 740 which also partially forms the outer contour of the passage component part 650. More precisely, the configuration of the passage component part 650 shown in FIG. 3 has nine corresponding recesses 740-1, . . . , 740-9 which are shaped like circle sectors. This also results in a closure with non-circular geometry.

Figure 4A:
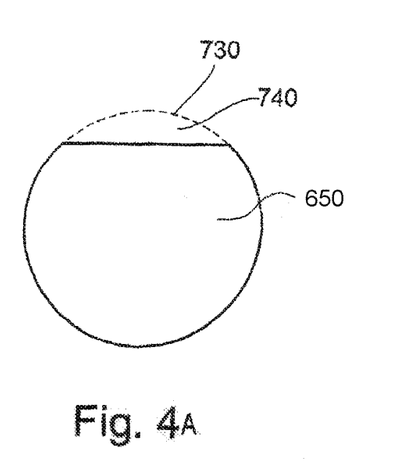
FIG. 4A is a top view of a further passage component part of the invention with a non-circular contour.
Figure 4B:
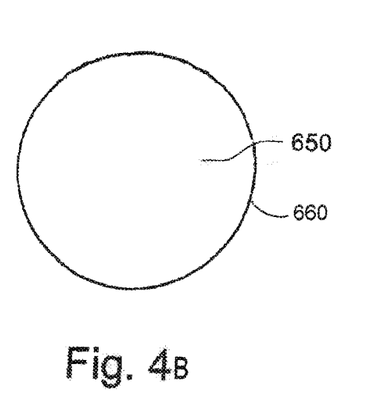
FIG. 4B is a top view of a further receiving opening with a fluid-tight closure.

FIG. 4 shows a further embodiment of a passage component part 650 which again has a convex base portion 730 which is shown in dashes again in FIG. 4 and is substantially circular. Further, the passage component part 650 shown in FIG. 4 also has a recess 740 which is shaped like a circle segment and correspondingly forms a passage opening 670 when inserted into a circular receiving opening 660.

Figure 5:
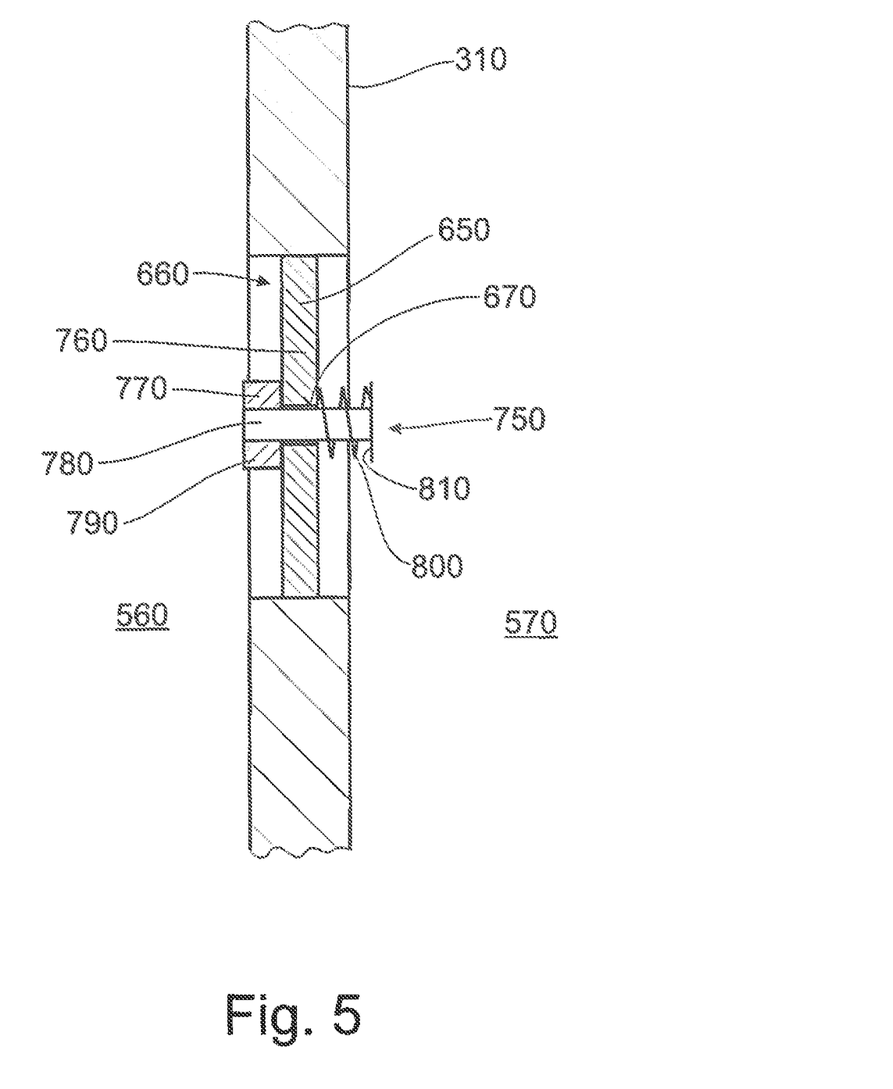
FIG. 5 is a cross-sectional view through a piston of the invention with a receiving opening and a sealing component part which comprises a valve in the form of a check valve.

FIG. 5 shows an embodiment of a starting element 100 and piston 310 in which the passage component part 650 which is inserted into the receiving opening 660 implements a valve 750 in the form of a check valve. Accordingly, the passage component part 650 forms a substantially disk-shaped base body 760 in which the passage opening 670 is arranged. In this embodiment, the passage opening 670 is also again completely formed in the passage component part 650.

However, the passage component part 650 has a sealing die 770 having a cylindrical portion 780 which extends substantially perpendicular to the receiving opening 660 and has a diameter which is smaller than that of the passage opening 670. Correspondingly, the cylindrical portion 780 projects through the passage opening 670. In contrast, the sealing die 770 in the first volume 560 has a sealing body 790 which is likewise cylindrical but has a diameter that is greater than the passage opening 670. Accordingly, the sealing body 790 can close the passage opening 670 when the sealing body 790 is pressed on the base body 760.

To make this possible, the valve 750 has a compression spring 800 which contacts sides of the second volume 570 between the base body 760 and a contact projection of the sealing die 770. The contact projection 810 has a diameter which is greater than that of the passage opening 670 and greater than a diameter of the compression spring 800.

If there occurs on sides of the second volume 570 a pressure that is sufficiently large to move the cylindrical portion 780 out of its neutral position shown in FIG. 5 in direction of the first volume 560, the valve 750 opens and accordingly releases the passage opening 670. In this case, a fluid exchange between the two volumes 560, 570 is possible in a laterally limited manner when the corresponding pressure conditions, i.e., the corresponding pressure difference and the corresponding pressure gradient, are present. If this collapses again, i.e., if the pressure difference drops below a predetermined value, the valve 750 closes again and accordingly connects the flow-through of the fluid through the passage opening 670. On the other hand, if the predetermined pressure difference is reached, the valve 750 can open in a corresponding manner as was described.

Of course, in other embodiments of a starting element a plurality of corresponding, possibly differently configured valves 750 can also be implemented. Also—regardless of the quantity of the correspondingly implemented valves 750—this can also possibly be used in rotated orientation so that the roles of the first volume 560 and second volume 570 are reversed. In this way it may be possible where appropriate to use a tension spring or other corresponding spring element instead of a compression spring 800 as is shown in FIG. 5.

An embodiment such as is shown in FIG. 5 can possibly further increase a precision of the passage opening 670 which may possibly be of crucial importance for the reliable operation of the starting element 100. Accordingly, it may be advisable to implement a valve 750 such as is shown in FIG. 5 in the receiving opening 660, for example, as part of the passage component part 650. In this way, a check valve which blocks in one direction can be implemented, for example.

A further embodiment can also be implemented, for example, in that a receiving opening 660, i.e., for example, an already existing assembly opening, is partially closed by welding, soldering or another suitable method and is reduced again to a desired opening dimension. In an embodiment of this kind, the passage opening 670 can also be formed by a closure of the receiving opening 660 which is partially formed by a bonding connection, for example. In this case, the passage component part is formed by the material used for welding or soldering. A shaped ceramic piece, for example, can be used to achieve a defined passage opening 670, which shaped ceramic piece is removed again after closing and accordingly defines the passage opening 670.

Figure 6:
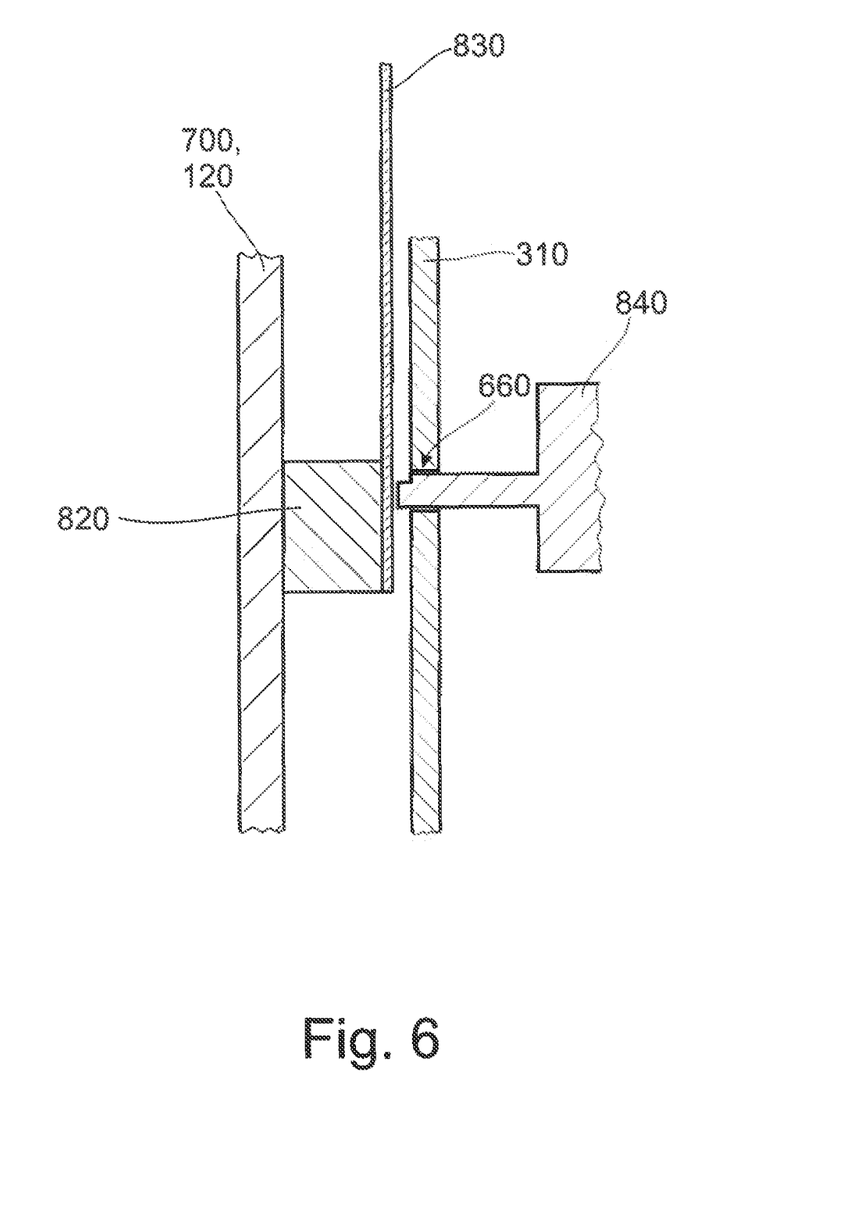
FIG. 6 is a cross sectional view through a starting element according to an embodiment of the invention during its production in which an additional tool is inserted between a rivet and a staking punch.

Finally, FIG. 6 schematically shows a constructional variant with a smaller assembly opening 660. In this case, the receiving opening 660, also referred to as assembly opening, can be small enough, for example, that the staking cross section required for riveting can no longer be inserted through the receiving opening 660. Accordingly, FIG. 6 shows a situation in which an unprocessed rivet 820 is arranged on the housing shell 120 or component part 700 and is held by an additional riveting tool 830. With the intermediary of the additional riveting tool 830 which is inserted between the rivet 820 and a corresponding staking punch or riveting tool 840, the riveting process may possibly be carried out more successfully and reliably nevertheless. Depending on the concrete implementation, the additional riveting tool 830 can possibly be removed from the starting element 100 again in some other manner or possibly remains therein.

Of course, a plurality of receiving openings 660 can also be used in a piston 310 for fluid exchange. Also, the receiving openings 660 need not necessarily be openings which are provided for riveting, for example. Of course, other openings can also be used as receiving openings 660 for corresponding passage component parts 650.

Naturally, further piston jets can also be additionally arranged in a piston 310 of a starting element 100. Depending on the specific application, different opening cross sections can accordingly be realized with the same or at least comparable receiving openings 660 so that a production of a starting element 100 as a modular unit can possibly be simplified by modular construction. This makes it possible to utilize a potential for automation.

The passage component parts 650 can completely or partially form passage openings 670 with a defined opening cross section. Depending on the specific arrangement, it may be advisable in this case to arrange the receiving openings 660, i.e., the subsequent piston jets, closer to the friction areas of the friction clutch 270 than the friction linings 300 as far as possible. In this way it may be possible where appropriate to achieve improved cooling.

Through the use of an embodiment example, it may be possible where appropriate to simplify the production of a starting element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A starting element (100) for a drivetrain of a motor vehicle, comprising:
    a piston (310) dividing a first volume (560) that can be filled with a fluid from a second volume (570) that can be filled with a fluid, wherein the piston (310) comprises at least one fluid passage (640) for allowing the fluid to pass through the piston (310) from the first volume (560) into the second volume (570) and from the second volume (570) into the first volume (560); wherein the at least one fluid passage (640) comprises a passage component part (650) having an outer contour and a receiving opening (660) in the piston (310); and wherein the passage component part (650) comprises at least one passage opening (670) extending through the passage component part (650) to allow unimpeded bidirectional flow of the fluid through the at least one passage opening (670) when the passage component part (650) is inserted into the receiving opening (660) in the piston (310);
    wherein the at least one passage opening (670) is completely contained in the passage component part (650) so that the passage opening (670) is not in contact with the outer contour of the passage component part (650); and
    wherein the passage component part (650) is formed to completely close the receiving opening (660) except for the at least one passage opening (670) extending through the passage component part (650).

2. The starting element (100) according to claim 1, wherein the passage component part (650) and the piston (310) have a material thickness, the material thickness of the passage component part (650) being smaller than the material thickness of the piston (310).

3. The starting element (100) according to claim 1, additionally comprising a component part (700); and wherein the receiving opening (660) is formed such that an area between the piston (310) and the component part (700) is accessible to a tool from a side of the piston (310) remote of the component part (700).

4. The starting element (100) according to claim 3, wherein the component part (700) is connected to the piston (310) by a connection component part (320), and wherein the receiving opening (660) is arranged so that the connection of the component part (700) and of the connection component part (320) is accessible.

5. The starting element (100) according to claim 1, wherein the starting element (100) is formed so as to transmit a rotational movement around an axis of rotation (190) from an input side (140) to an output side (220) of the starting element (100).

6. The starting element (100) according to claim 1, wherein the passage opening (670) has a circular contour.

7. The starting element (100) according to claim 1, wherein the receiving opening (660) has a circular contour.

8. The starting element (100) according to claim 1, wherein the fluid passage (640) includes a valve (750) formed to allow the passage of fluid when a predefined pressure difference between the first volume (560) and second volume (570) is reached or exceeded.

9. The starting element (100) according to claim 1, wherein the piston (310) comprises at least one further receiving opening, the at least one further receiving opening having a fluid-tight closure.

10. The starting element (100) of claim 1, wherein the receiving opening (660) has a first diameter and the passage opening (670) has a second relatively smaller diameter than the diameter of the receiving opening (660).

* * * * *